United States Patent
Chou (10) Patent No.: US 9,304,052 B2
(45) Date of Patent: Apr. 5, 2016

(54) MANOMETER WITH PRIMARY AND AUXILIARY SPRINGS

(71) Applicant: Wen-San Chou, Tainan (TW)

(72) Inventor: Wen-San Chou, Tainan (TW)

( * ) Notice: Subject to any disclaimer, the term of this patent is extended or adjusted under 35 U.S.C. 154(b) by 122 days.

(21) Appl. No.: 14/159,745

(22) Filed: Jan. 21, 2014

(65) Prior Publication Data

US 2014/0216164 A1   Aug. 7, 2014

(30) Foreign Application Priority Data

Feb. 1, 2013   (TW) .............................. 102104100 A (51) Int. Cl.
*G01L 7/16* (2006.01)

(52) U.S. Cl.
CPC ................. *G01L 7/166* (2013.01); *G01L 7/163* (2013.01)

(58) Field of Classification Search
CPC ............ G01L 7/16; G01L 7/163; G01L 7/166
USPC .......... 73/732, 744; 33/710, 571; 222/23, 154
See application file for complete search history.

(56) References Cited

U.S. PATENT DOCUMENTS

| | | | | |
|---|---|---|---|---|
| 2,038,928 | A | * | 4/1936 | Farley et al. ..................... 73/744 |
| 2,136,261 | A | * | 11/1938 | Anderson ........................ 73/861 |
| 3,131,667 | A | * | 5/1964 | Sajeck ..................... G01L 19/08 116/34 R |
| 3,678,754 | A | * | 7/1972 | Amir et al. ...................... 73/744 |
| 5,734,109 | A | * | 3/1998 | Thanscheidt .................. 73/744 |
| 2006/0277988 | A1 | * | 12/2006 | Huang ..................... G01L 17/00 73/146.8 |

FOREIGN PATENT DOCUMENTS

FR   1254458 A1 *  2/1961  ................ G01L 7/16

OTHER PUBLICATIONS

Machine Translation of FR1254458A, Date: Feb. 24, 1961, Publisher: Espacenet, European Patent Office, pages: Bibliographic Data Sheet and 3 pages of Description.*

* cited by examiner

*Primary Examiner* — Lisa Caputo
*Assistant Examiner* — Roger Hernandez-Prewitt (57) ABSTRACT

A manometer comprises a manometer body with an indicating scale with graduated markings of pressure units and a safety vent, a plunger with a annular groove and a tinted O-ring a cap mount, a primary box spring and an auxiliary box spring. By means of the tinted O-ring and the indicating scale with graduated markings of pressure units, the manometer innovatively functions as indication of air pressure measured. By means of the primary box spring and auxiliary box spring, the manometer precisely measures overall air pressure in combination of coarse air pressure variation responded by the primary box spring and fine air pressure variation responded by the auxiliary box spring. By means of the safety vent disposed on the peripheral of manometer body and the tinted O-ring on the plunger, the manometer provides a safety proactive means for input compressed air.

10 Claims, 7 Drawing Sheets

MANOMETER WITH PRIMARY AND AUXILIARY SPRINGS

TECHNICAL FIELD OF THE INVENTION

The present invention relates to a manometer, particularly for one having primary box spring with auxiliary box spring, safety vent with tinted O-ring and indicating scale with graduated markings.

BACKGROUND OF THE INVENTION

A manometer is also called pressure meter or pressure gauge. Currently, conventional manometers can be roughly classified into two categories as electronic type and mechanical type. The electronic manometer typically integrates a pressure sensor and related electronic components to measure and display pressure value measured for example as Taiwan (ROC) patent application in number of TW093124608. Most mechanical manometers are adapted from Bourdon gauge, which basically integrates a Bourdon tube, a pivot with a pivot pin, a lever, a sector gear with gear train, an indicator needle and a hair spring to measure and display pressure value measured for example as Taiwan (ROC) patent application in number of TW088203528. Other mechanical manometers are adapted from diaphragm gauge, which basically integrates a diaphragm, a sliding shaft, sliding cylinder, a helical wire, a spring and an indicator needle to measure and display pressure value measured for example as Taiwan (ROC) patent application in number of TW6510501. However, there are some drawbacks in foregoing conventional manometers. Firstly, for displaying pressure value measured, both of the electronic manometer and mechanical manometer involve too many components with complicated structure. Secondly, for air pressure in the manometer, there is no protective means to keep it in safety range.

Having realized and addressed drawbacks aforesaid for conventional manometers, the applicant of the present invention works out a simple contrivance of the present invention to solve all the drawbacks aforesaid.

SUMMARY OF THE INVENTION

Accordingly, the primary object of the present invention is to provide a manometer, which comprises a manometer body accommodating a plunger, a cap mount, a primary box spring and an auxiliary box spring. By means of the primary box spring and auxiliary box spring function as overall air pressure reflection in combination of coarse air pressure variation responded by the primary box spring and fine air pressure variation responded by the auxiliary box spring the value of the air pressure can be precisely measured.

A further object of the present invention is to provide a manometer, which comprises a manometer body of transparent cylinder with an indicating scale with graduated markings of pressure units on the peripheral and an internal cylindrical cavity, a plunger with a tinted O-ring sleeved on an annular groove, a cap mount, a primary box spring and an auxiliary box spring. By means of the tinted O-ring sleeved on the annular groove of the plunger and the indicating scale with graduated markings of pressure units on the manometer body function as indication of air pressure measured, the user can easily read out the measured value of the air pressure.

Another object of the present invention is to provide a manometer, which comprises a manometer body with a safety vent disposed on the peripheral of manometer body in a selective calibrated position preset by the requirement for the upper safety limit of the air pressure from input compressed air, a plunger with a tinted O-ring sleeved on an annular groove, a cap mount, a primary box spring and an auxiliary box spring. By means of the safety vent disposed on the peripheral of manometer body and the tinted O-ring sleeved on the annular groove of the plunger function as safety proactive means for input compressed air, when the air pressure of input compressed air exceeds the upper safety limit preset for the manometer body, the tinted O-ring sleeved on the annular groove of the plunger will pass the safety vent to let subsequent input compressed air discharge out of the manometer body via the safety vent to disable the movement of the plunger.

The other object of the present invention is to provide a manometer, which comprises a manometer body with various docking means and anchoring means, a plunger with a tinted O-ring sleeved on an annular groove, a cap mount, a primary box spring and an auxiliary box spring so that it is easily jointed with external air compressor on a trailer, truck or other vehicles.

The real structure and effects of the present invention for achieving foregoing objects are disclosed in the following preferred exemplary embodiments with related drawings.

DESCRIPTION OF THE PREFERRED EMBODIMENTS

Please refer to FIGS. 1 through 4, which show the first exemplary preferred embodiment for a manometer of the present invention. The manometer of the present invention comprises a manometer body 1, a plunger 2, a cap mount 5, a primary box spring 3 and an auxiliary box spring 4, wherein said manometer body 1, which is a transparent cylinder with an indicating scale with graduated markings of pressure units 19 on the peripheral and an internal cylindrical cavity 11, includes a round head-end opening 10 with peripheral male thread 12, a round breech 13 having a centrally protruded adaptor 15 with a central internal longitudinal passage 150 and two separated peripheral O-ring 16 and 17, a pair of docking clamps 14, a pair of anchoring lugs 18 and a safety vent 191, wherein the pair docking clamps 14 are symmetrically disposed on the peripheral of the round breech 13, and the pair anchoring lugs 18 are symmetrically disposed on the peripheral of manometer body 1 at suitable middle location such that all the round head-end opening 10, internal cylindrical cavity 11, round breech 13 and adaptor 15 are arranged in coaxial manner; said plunger 2, which has a cylindrical body with a round head-end opening 20, an internal cylindrical cavity 21 and a round breech base 24 with an air cavity 26 and an annular groove 25 for receiving a tinted O-ring 27, includes a major shaft 22 with an annular pushing ledge 221 and an annular pushing dent 222, an elongate minor shaft 23, wherein the elongate minor shaft 23 is stacked on the major shaft 22 in cascaded manner, the annular pushing ledge 221 is formed at the joint of the elongate minor shaft 23 and major shaft 22 while the annular pushing dent 222 is formed at the joint of the major shaft 22 and round breech base 24 such that all the round head-end opening 20, internal cylindrical cavity 21, major shaft 22, elongate minor shaft 23, round breech base 24, annular groove 25, air cavity 26, annular pushing ledge 221 and annular pushing dent 222 are arranged in coaxial manner; When the plunger 2 is inserted into the internal cylindrical cavity 11 of the manometer body 1 such that the round breech base 24 thereof contacts against the internal bottom of the internal cylindrical cavity 11, the internal longitudinal passage 150 of the adaptor 15 is enabled to communicate with the air cavity 26 in the round breech base 24 so that input pressure such as compressed air from air compressor acts on the plunger 2 via the internal longitudinal passage 150 and air cavity 26; Thereby, the plunger 2 will reciprocally move to and fro in the internal cylindrical cavity 11 of the manometer body 1; said cap mount 5, which has a cap head 51 with fluted peripheral, a set of internal female threads 50, a round longitudinal passage 54, a reduced round longitudinal passage 56 and a hexagonal head hole 55, includes an internal central cylinder 52 with an internal cylindrical cavity 520 and a round breech opening 521, an annular receptacle 53, a minor annular counter-ledge 511 and a major annular counter-ledge 512, wherein the minor annular counter-ledge 511 is formed at the joint of the reduced round longitudinal passage 56 and internal cylindrical cavity 520 while the major annular counter-ledge 512 is formed at the joint of the cap head 51 and internal central cylinder 52, the round longitudinal passage 54 and reduced round longitudinal passage 56 are configured as an integral tiered cavity of two stacked hollow frusta in reducing diameter manner to allow the internal cylindrical cavity 520 of the internal central cylinder 52 for being communicable with the reduced round longitudinal passage 56, round longitudinal passage 54 and hexagonal head hole 55 in the cap head 51 such that all the internal female thread 50, cap head 51, internal central cylinder 52, annular receptacle 53, round longitudinal passage 54, reduced round longitudinal passage 56, hexagonal head hole 55, internal cylindrical cavity 520, round breech opening 521, minor annular counter-ledge 511 and major annular counter-ledge 512 are arranged in coaxial manner; Moreover, the inner diameter of the internal cylindrical cavity 520 is just big enough to suitably accommodate the outer diameter of the major shaft 22 while the outer diameter of the internal central cylinder 52 is just small enough to be suitably sleeved by the inner diameter of the primary box spring 3; said primary box spring 3, which is a helical spring of relatively high elasticity coefficient with a head end (right in figure) and a breech end (left in figure), is inserted into the internal cylindrical cavity 21 and sleeved over the major shaft 22 of the plunger 2 as well as secured in manner that the breech end and the head end of the primary box spring 3 are respectively held by the corresponding holder pair of the annular pushing-dent 222 in the plunger 2 and major annular counter-ledge 512 in the cap mount 5 such that the peripheral thereof suitably contacts against the inner wall of the plunger 2; and said auxiliary box spring 4, which is a helical spring of relatively low elasticity coefficient with a head end (right in figure) and a breech end (left in figure), is inserted into the internal cylindrical cavity 520 of the internal central cylinder 52 in the cap mount 5 and partially sleeved over the elongate minor shaft 23 of the plunger 2 as well as secured in manner that the breech end and the head end of the auxiliary box spring 4 are respectively held by the corresponding holder pair of the annular pushing-ledge 221 in the plunger 2 and minor annular counter-ledge 511 in the cap mount 5 such that the peripheral thereof suitably contacts against the inner wall of the internal central cylinder 52.

Figure 1:
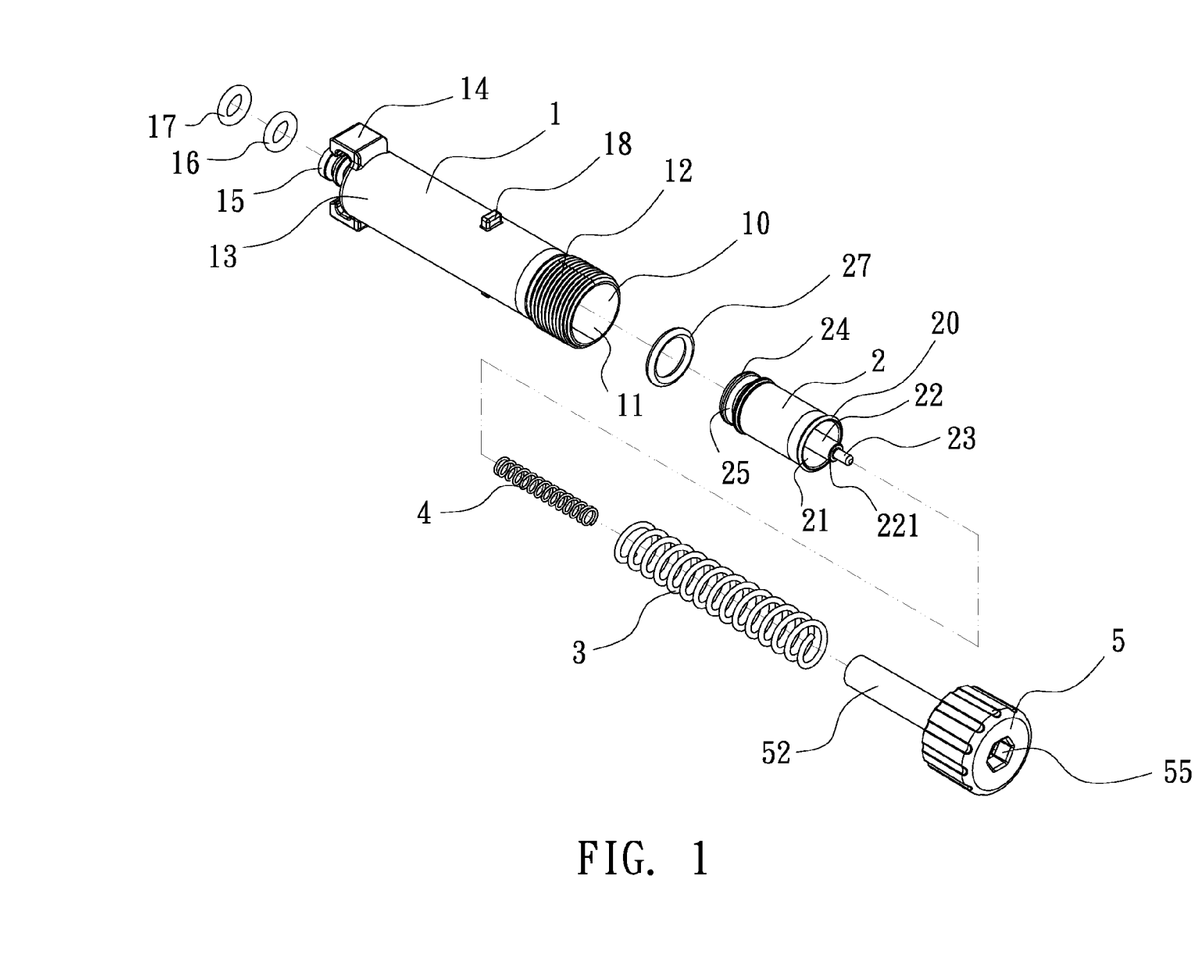
FIG. 1 is a perspective exploded schematic view showing the first exemplary preferred embodiment for a manometer of the present invention.
Figure 2:
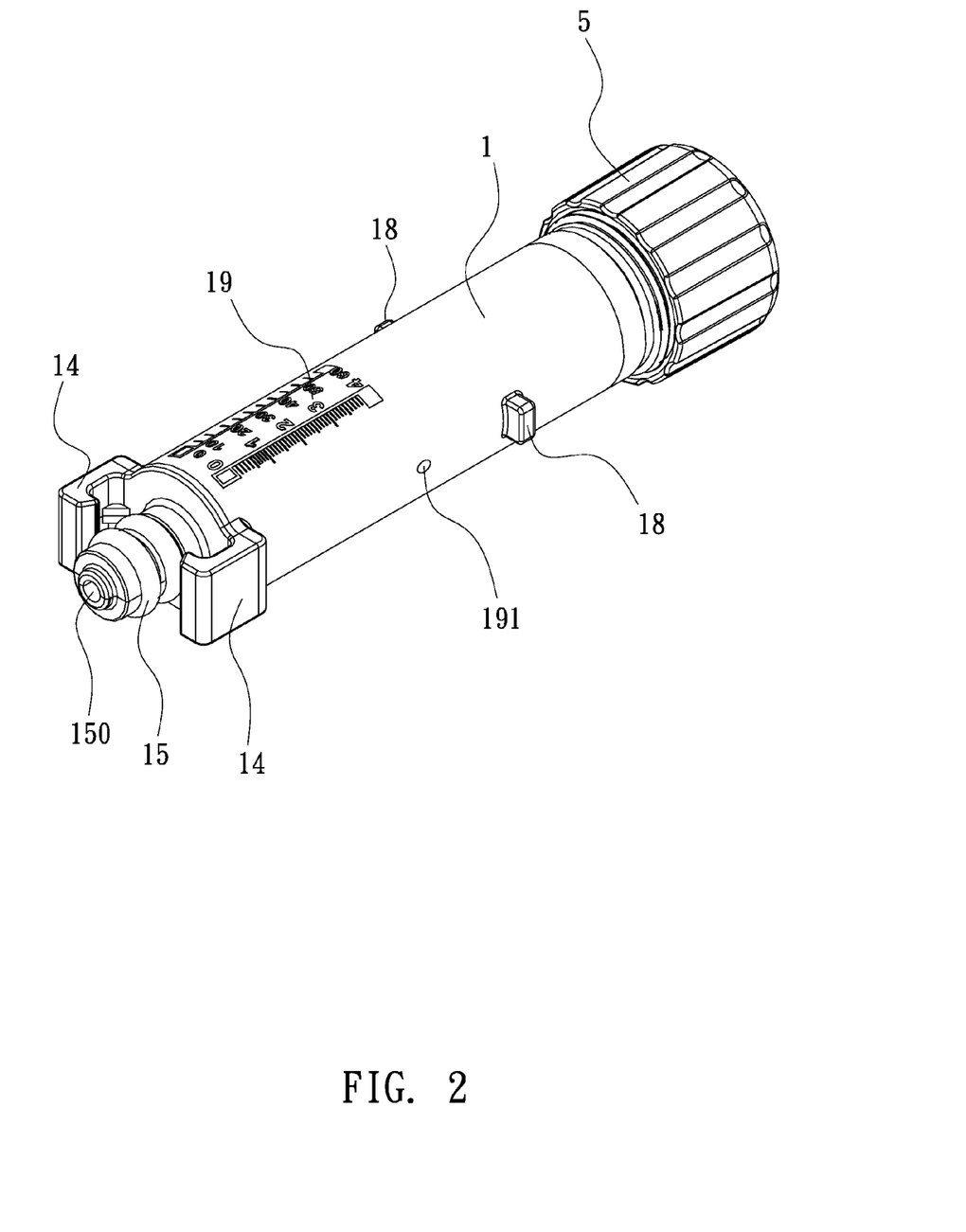
FIG. 2 is a perspective assembled schematic view showing the first exemplary preferred embodiment for a manometer of the present invention.

The manometer is integrated as shown in FIG. 2 after having assembled all foregoing manometer body 1, plunger 2, cap mount 5, primary box spring 3 and auxiliary box spring 4 as well as tinted O-ring 27, O-rings 16 and 17.

Figure 3:
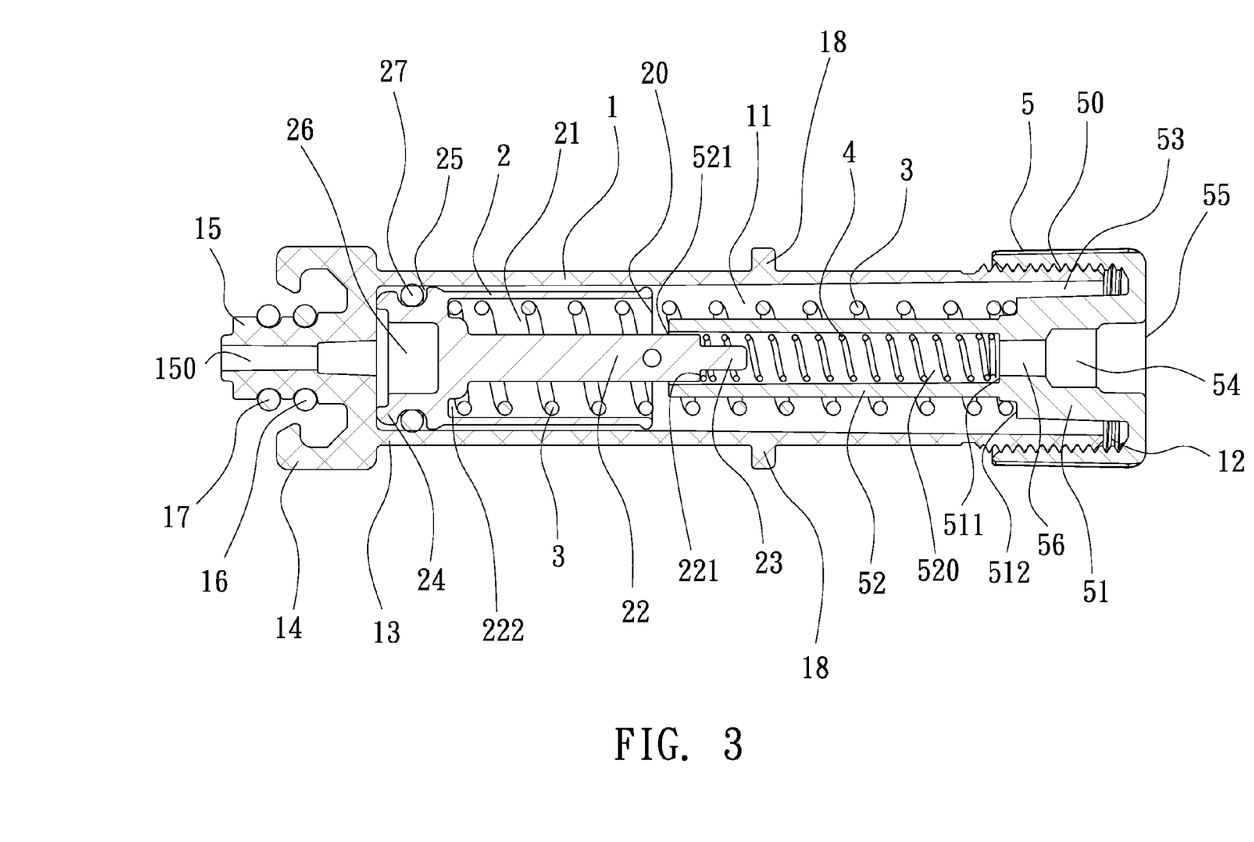
FIG. 3 is a cross sectional schematic view showing the first exemplary preferred embodiment for a manometer of the present invention sectioned along the longitudinal axis thereof.
Figure 4:
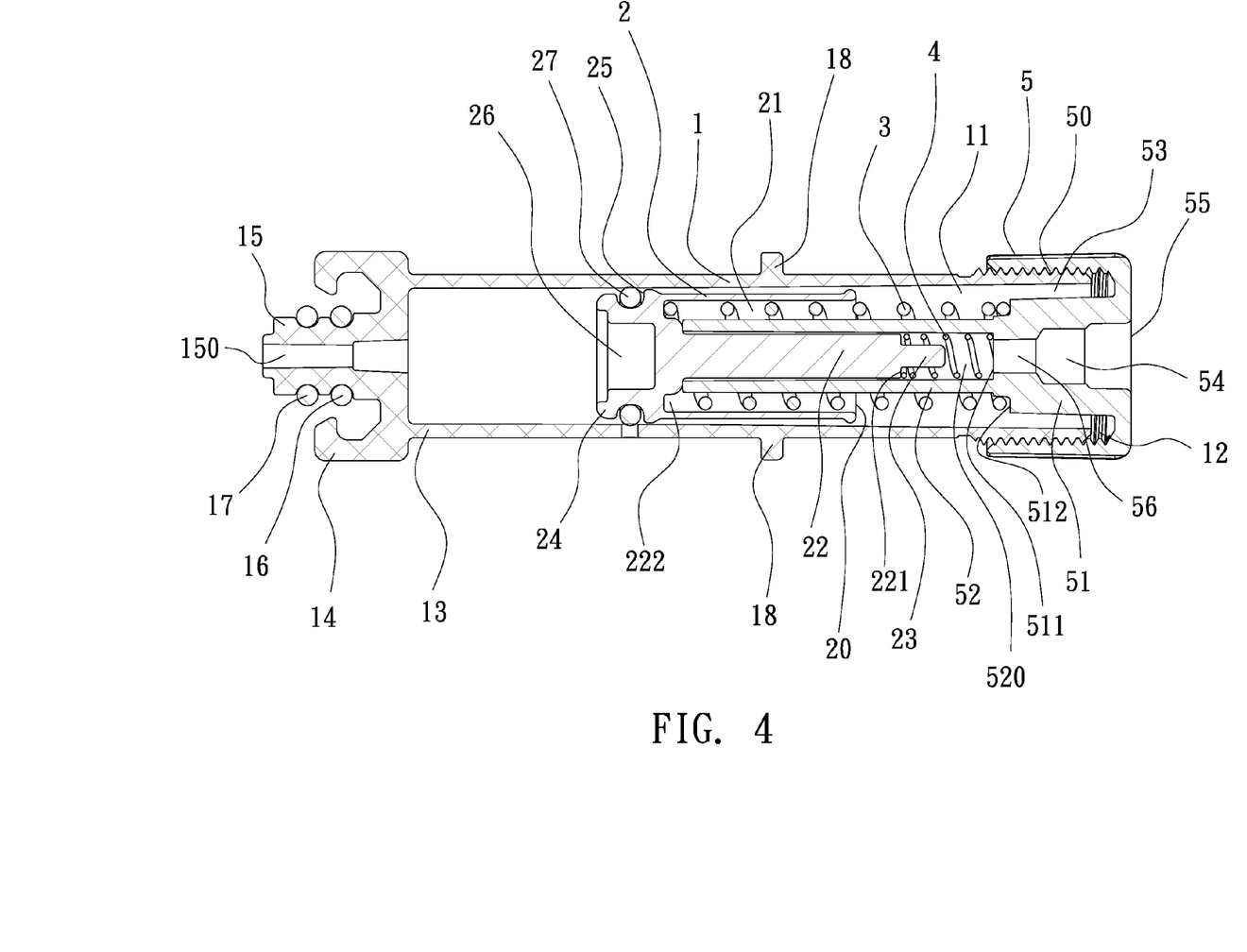
FIG. 4 is a cross sectional schematic view showing the first exemplary preferred embodiment in operation for a manometer of the present invention sectioned along the longitudinal axis thereof.

Please refer to FIGS. 2 through 5, which show the first exemplary preferred embodiment for a manometer of the present invention combined with an air compressor 6. The air compressor 6 comprises a motor 60, a cylinder 61, a piston 62 and an air storage vessel 63 in association with accessories of a manifold fitting with two air outlets of 64 and 65, a flexible tube 66, an air nozzle 67, a rectangular docking plate 68 and a driving transmission mechanism 69 such as driving belt, wherein the rectangular docking plate 68 serves to couple with the pair peripheral docking clamps 14 of the manometer body 1 so that air outlet 65 thereof becomes communicable to the central internal longitudinal passage 150 in the adaptor 15 of the manometer body 1. When motor 60 of the air compressor 6 is powered on, the piston 62 is indirectly driven by the driving transmission mechanism 69 to reciprocally move to and fro in the cylinder 61 so that the compressed air is pumped to the air storage vessel 63, from where the compressed air is divided to output from two air outlets of 64 and 65 of the manifold fitting respectively. Wherein, the air outlet 64 is connected to an external object to be inflated by the compressed air such as vehicle tires while the air outlet 65 is connected to the central internal longitudinal passage 150 in the adaptor 15 of the manometer body 1 so that air outlet 64 flows into the air cavity 26 in the round breech base 24 of the plunger 2 via the central internal longitudinal passage 150 in the adaptor 15. The compressed air in the air cavity 26 respectively acts on the auxiliary box spring 4 in the internal central cylinder 52 of the internal central cylinder 52 and the primary box spring 3 in the internal cylindrical cavity 11 of the manometer body 1 via the plunger 2 and its related components, so that the auxiliary box spring 4 reflects fine variation of the air pressure while the primary box spring 3 reflects coarse variation of the air pressure for the input compressed air, which is responded by the sliding of the plunger 2 towards to the cap mount 5 in the internal cylindrical cavity 11 of the manometer body 1 for reflecting overall variation for the air pressure of the input compressed air. Thus, the overall variation for the air pressure of the input compressed air manifests on the relative displacement of the tinted O-ring 27 sleeved on the annular groove 25 of the plunger 2 to the indicating scale with graduated markings of pressure units 19 on the manometer body 1 so that it can be easily read out by the user via looking the position of the tinted O-ring 27 by passing the manometer body 1 because the manometer body 1 is a transparent cylinder (as shown in FIGS. 3 and 4).

Figure 5:
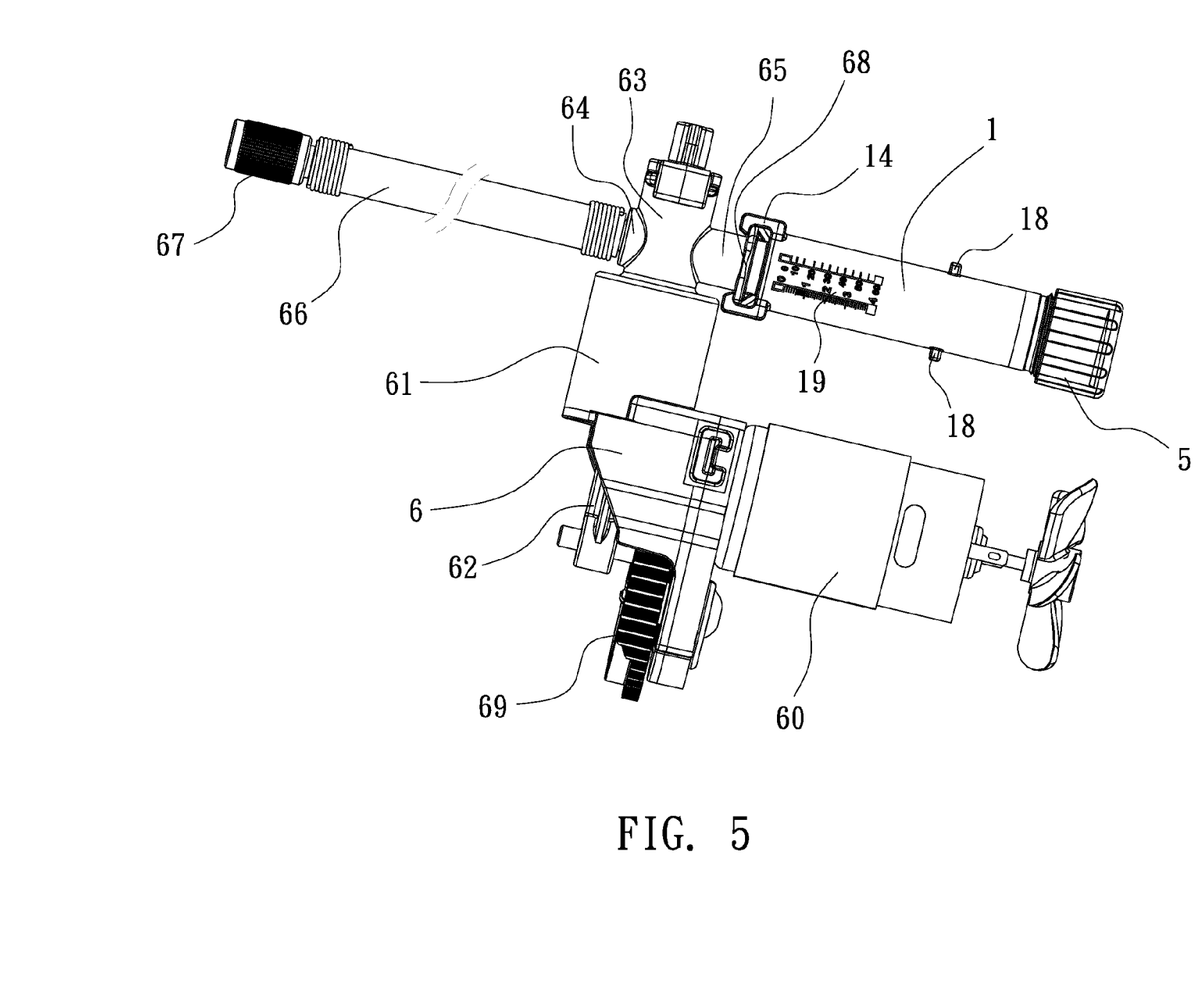
FIG. 5 is an illustrative schematic view showing the first exemplary preferred embodiment for a manometer of the present invention combined with an air compressor.
Figure 6:
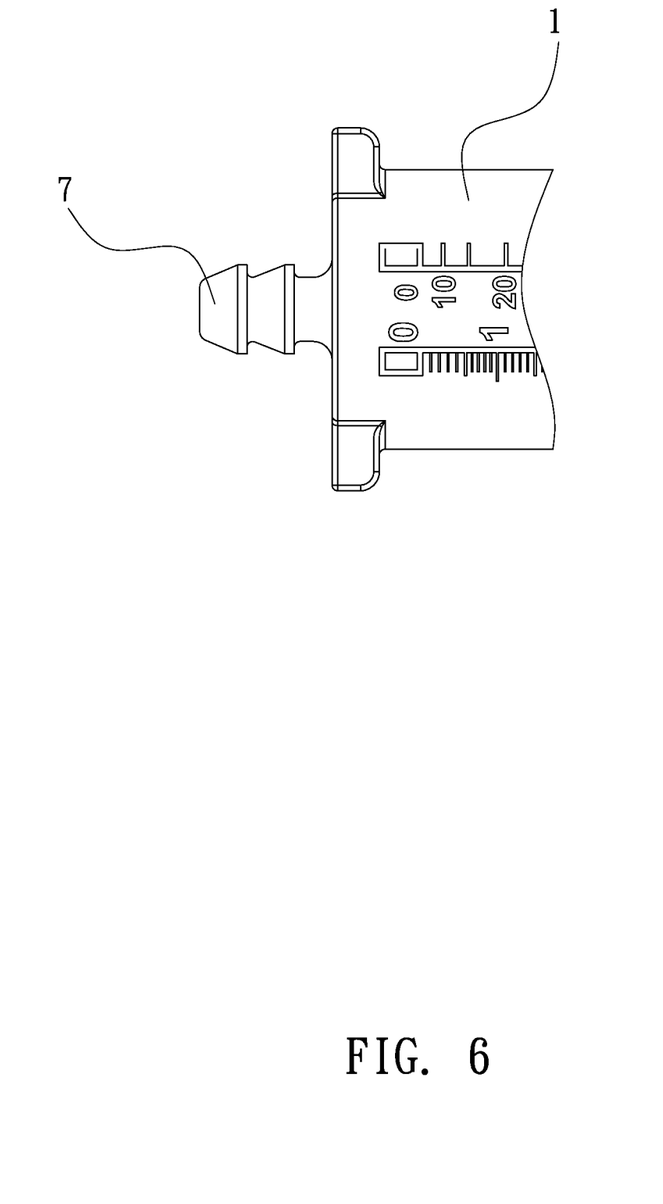
FIG. 6 is a schematic view showing the second exemplary preferred embodiment for a modified adaptor for a manometer of the present invention.
Figure 7:
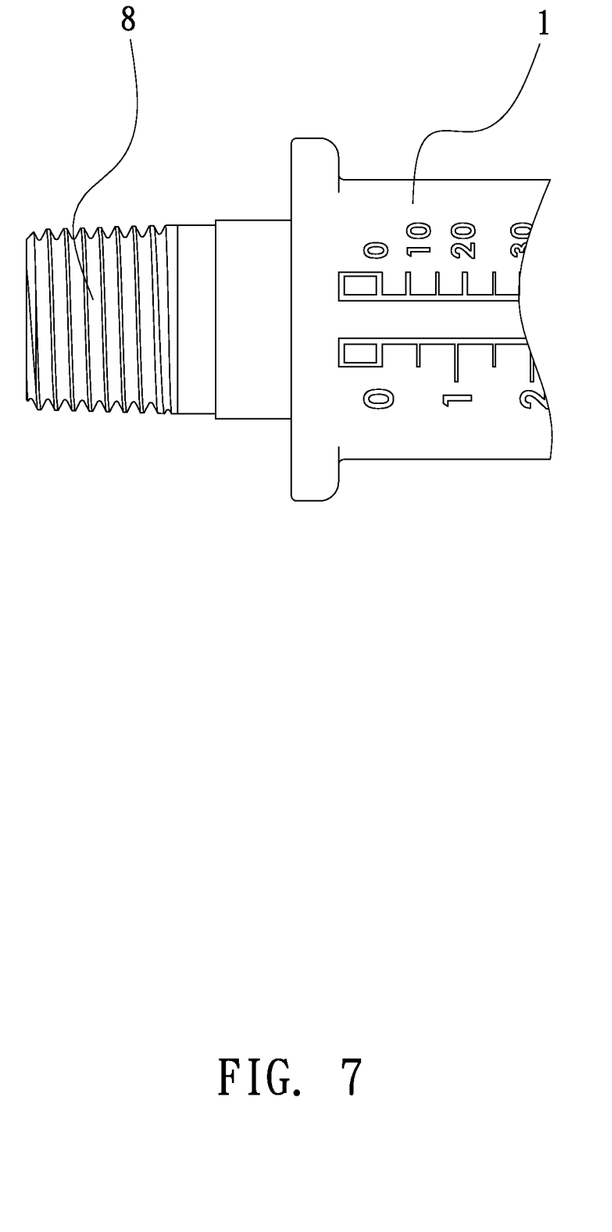
FIG. 7 is a schematic view showing the third exemplary preferred embodiment for another modified adaptor for a manometer of the present invention.

The pair peripheral docking clamps 14 and the adaptor 15 in the round breech 13 of the manometer body 1 are contrived to match the features of the corresponding couplings such as the pair peripheral docking clamps 14 matching the rectangular docking plate 68 on the air outlet 65 of manifold fitting of the air compressor 6 for quickly docking and de-docking mutually (as shown in FIG. 5). Alternatively, if no rectangular docking plate 68 is provided on the air compressor 6, a modified barbed adaptor 7 on the round breech 13 of the manometer body 1 to replace the adaptor 15 for securely inserting into the flexible tube 66 extended from the air outlet 65 of manifold fitting on the air compressor 6 (as shown in FIG. 6). Similarly, a modified threaded adaptor 8 with a corresponding set of male threads is disposed on the round breech 13 of the manometer body 1 to replace the adaptor 15 for firmly screwing with the air outlet 65 of manifold fitting on the air compressor 6 mutually if the air outlet 65 of manifold fitting on the air compressor 6 is a set of female threads (as shown in FIG. 7).

If the air compressor 6 is transported by a trailer, truck or other vehicle, which normally provides a handling case with a plurality of fastening ribs or dents for accommodating the air compressor 6 and the manometer of the present invention, the pair anchoring lugs 18 are symmetrically provided on the peripheral of manometer body 1 for easily being fixed on the corresponding ribs or dents on the handling case firmly.

When the compressed air inputs into the manometer body 1 of the present invention, auxiliary box spring 4 firstly reacts with the fine pressure variation of the input compressed air, and the primary box spring 3 will not react until the accumulated fine pressure variation becomes coarse pressure variation of the input compressed air because the primary box spring 3 is a helical spring of relatively high elasticity coefficient while the auxiliary box spring 4 is a helical spring of relatively low elasticity coefficient. While the compressed air continuously inputs into the manometer body 1, the plunger 2 simultaneously acts on both of the primary box spring 3 and auxiliary box spring 4 respectively until the inflation to the target object is finished. When the manometer of the present invention is detached of the inflated target object, the ambient air gets into the manometer body 1 orderly via the hexagonal head hole 55, round longitudinal passage 54 and reduced round longitudinal passage 56 in the cap mount 5, and the plunger 2 resumes to initial reset position by the combinational resilience of the primary box spring 3 and auxiliary box spring 4.

The safety vent 191 is disposed on the peripheral of manometer body 1 in a selective calibrated position preset by the requirement for the upper safety limit of the air pressure from input compressed air. When the air pressure of input compressed air exceeds the upper safety limit preset for the manometer body 1, the tinted O-ring 27 sleeved on the annular groove 25 of the plunger 2 will pass the safety vent 191 to let subsequent input compressed air discharge out of the manometer body 1 via the safety vent 191 so that not only the target object to be inflated is protected from over-inflation but also the box springs 3 and 4 are protected from elastic fatigue incurred by over-compression.

In conclusion the disclosure heretofore, comparing to the conventional manometer, the manometer of the present invention has following innovative contrivances: by means of the tinted O-ring 27 sleeved on the annular groove 25 of the plunger 2 and the indicating scale with graduated markings of pressure units 19 on the manometer body 1 function as indication of air pressure measured; by means of the primary box spring 3 and auxiliary box spring 4 function as overall air pressure reflection in combination of coarse air pressure variation responded by the primary box spring 3 and fine air pressure variation responded by the auxiliary box spring 4; and by means of the safety vent 191 disposed on the peripheral of manometer body 1 and the tinted O-ring 27 sleeved on the annular groove 25 of the plunger 2 function as safety proactive means for input compressed air. Apparently, the manometer of the present invention indeed possesses novelty, non-obviousness and industrial application usage, which meet the basic criterion of patentability. Accordingly, we submit the patent application for the present invention to you in accordance with related patent laws.

What is claimed is:

1. A manometer comprises
a manometer body,
a plunger,
a primary box spring capable of reflecting coarse air pressure variations,
a cap mount and
an auxiliary box spring capable of reflecting fine air pressure variations,
wherein said manometer body, which is a cylinder with an internal cylindrical cavity, includes a round head-end opening with peripheral male thread, a round breech and an indicating scale with graduated markings of pressure units on a peripheral near the round breech;
said plunger, which is to be accommodated in the internal cylindrical cavity of the manometer body, includes a cylindrical body with a round head-end opening, a round breech base and a internal cylindrical cavity;
said cap mount includes a cap head with a set of internal female threads to firmly screw with the peripheral male thread in the round head-end opening of the manometer body,
and said primary box spring is accommodated in the manometer body such that one of its end contacts against the internal bottom for the internal cylindrical cavity of the plunger while its other end contacts against the cap mount; by assembly of foregoing manometer body, plunger, cap mount and spring set, an air pressure in the manometer body input from an external compressed air source enables the plunger to pump the spring set therein so that a measured value of the air pressure is manifested by the indicating scale with graduated markings of pressure units.

2. The manometer is recited and claimed in claim 1, wherein said manometer body is a transparent cylinder while said plunger further includes an air cavity extended from the round breech base, an annular groove for receiving a tinted O-ring so that a user is able to look at the tinted O-ring together with the indicating scale with graduated markings of pressure units through the transparent cylinder of the manometer body so as to know a current measured value of an air pressure.

3. The manometer is recited and claimed in claim 2, wherein said manometer body further includes a safety vent disposed on a peripheral of manometer body in a selective calibrated position preset by a requirement for an upper safety limit of the air pressure from input compressed air so that an air pressure of input compressed air exceeds an upper safety limit preset for the manometer body, the tinted O-ring sleeved on the annular groove of the plunger passes the safety vent to let subsequent input compressed air discharge out of the manometer body via the safety vent to disable a movement of the plunger.

4. The manometer is recited and claimed in claim 1, wherein said plunger further includes a major shaft extended from an internal bottom center of the internal cylindrical cavity in the round breech base of the plunger, and an annular pushing-dent configured at a joint for the bottom of the major shaft and an internal wall of the plunger such that one end of the primary box spring contacts against the annular pushing-dent.

5. The manometer is recited and claimed in claim 4, wherein said plunger further includes an elongate minor shaft and an annular pushing ledge such that the elongate minor shaft is stacked on the major shaft in cascaded manner, the annular pushing ledge is formed at a joint of the elongate minor shaft and major shaft;

whereas the manometer body further includes a adaptor with a central internal longitudinal passage and two separated peripheral 0-rings disposed in the round breech of the manometer body such that the internal longitudinal passage of the adaptor is communicable with an air cavity in the round breech base to let an air pressure in the manometer body input from external compressed air source enable the plunger to reciprocally moves to and fro in the internal cylindrical cavity of the manometer body.

6. The manometer is recited and claimed in claim 4, wherein said cap mount further includes an internal central cylinder, an internal cylindrical cavity, a round breech opening as well as a minor annular counter-ledge and a major annular counter-ledge such that the minor annular counter-ledge is formed at a joint of the reduced round longitudinal passage and internal cylindrical cavity while the major annular counter-ledge is formed at a joint of the cap head and internal central cylinder; wherein said auxiliary box spring is inserted into the internal cylindrical cavity of the internal central cylinder in the cap mount and partially sleeved over the elongate minor shaft of the plunger as well as secured in manner that the breech end and the head end of the auxiliary box spring are respectively held by a corresponding holder pair of the annular pushing-ledge in the plunger and minor annular counter-ledge in the cap mount such that the peripheral thereof suitably contacts against an inner wall of the internal central cylinder; an inner diameter of the internal cylindrical cavity is just big enough to suitably accommodate the outer diameter of the major shaft while an outer diameter of the internal central cylinder is just small enough to be suitably sleeved by the inner diameter of the primary box spring.

7. The manometer is recited and claimed in claim 6, wherein said cap mount further includes a hexagonal head hole, a round longitudinal passage and reduced round longitudinal passage such that the round longitudinal passage and reduced round longitudinal passage are configured as an integral tiered cavity of two stacked hollow frusta in reducing diameter manner to allow the internal cylindrical cavity of the internal central cylinder for being communicable with the reduced round longitudinal passage, round longitudinal passage and hexagonal head hole in the cap head.

8. The manometer is recited and claimed in claim 1, wherein said manometer body further includes a pair of peripheral docking clamps symmetrically disposed on a peripheral of the round breech to couple with an external air compressor, wherein the air compressor comprises a motor, a cylinder, a piston and an air storage vessel in association with accessories of a manifold fitting with two air outlets, a flexible tube, an air nozzle, a rectangular docking plate and a driving transmission mechanism, wherein the rectangular docking plate serves to couple with the pair peripheral docking clamps of the manometer body so that air outlet thereof becomes communicable to the central internal longitudinal passage in the adaptor of the manometer body.

9. The manometer is recited and claimed in claim 8, wherein a modified barbed adaptor is disposed on the round breech of the manometer body for securely inserting into the flexible tube extended from one of the two air outlets of manifold fitting on the air compressor, which is connected to the internal longitudinal passage of the adaptor.

10. The manometer is recited and claimed in claim 8, wherein a modified threaded adaptor with a corresponding set of male threads is disposed on the round breech of the manometer body for firmly screwing with the air outlet of manifold fitting on the air compressor mutually if the air outlet of manifold fitting on the air compressor is a set of female threads.

* * * * *